United States Patent [19]
Van Fossan et al.

[11] Patent Number: 4,596,490
[45] Date of Patent: Jun. 24, 1986

[54] UNDERGROUND STORAGE CHAMBERS AND METHODS THEREFORE

[75] Inventors: Neal E. Van Fossan; John Rutherford, both of Houston, Tex.

[73] Assignee: Texas Brine Corporation, Houston, Tex.

[21] Appl. No.: 589,942

[22] Filed: Mar. 15, 1984

[51] Int. Cl.⁴ .............................................. B65G 5/00
[52] U.S. Cl. ....................................... 405/58; 405/53; 405/55
[58] Field of Search ...................... 405/53, 55, 56, 57, 405/58, 59, 128; 166/305 D

[56] References Cited

U.S. PATENT DOCUMENTS

| | | | |
|---|---|---|---|
| 2,869,328 | 1/1959 | Gibson et al. | 405/53 |
| 2,994,200 | 8/1961 | Carpenter | 405/57 X |
| 3,084,515 | 4/1963 | Dougherty | 405/53 |
| 3,277,654 | 10/1966 | Shiver | 405/59 X |
| 3,491,540 | 1/1970 | Lennemann | 405/53 |
| 3,505,821 | 4/1970 | Scisson et al. | 405/53 |
| 3,530,674 | 9/1970 | Cobbs et al. | 405/53 |
| 3,724,898 | 4/1973 | Jacoby | 405/58 X |
| 3,949,559 | 4/1976 | Meyer | 405/57 |
| 4,403,887 | 9/1983 | Gloria et al. | 405/59 X |
| 4,488,834 | 12/1984 | Hooper et al. | 405/58 |

FOREIGN PATENT DOCUMENTS

| | | | |
|---|---|---|---|
| 2539720 | 3/1977 | Fed. Rep. of Germany | 405/53 |
| 2549313 | 5/1977 | Fed. Rep. of Germany | 405/53 |

Primary Examiner—Cornelius J. Husar
Assistant Examiner—Nancy J. Stodola
Attorney, Agent, or Firm—Peter F. Casella

[57] ABSTRACT

This invention relates to a new and novel method for the underground storage of fluid materials including those which are readily soluable or reactive with water or brine such as concentrated caustic soda, ethylene dichloride or anhydrous ammonia within chambers developed in salt formations via solution mining and from which essentially all the brine has been removed; and the chambers thereby produced. More particularly this invention relates to methods for making underground storage chambers; of recovering the brine formed in the making of the chamber; isolating the contaminants, i.e., the insolubles mixed with brine resulting from the solution mining of the storage chamber, such that fluids soluable or reactive with water or brine can be stored therein; and also to a method for controlling the velocity of free fall of materials injected into the chamber for storage, such that erosion of the equipment employed is minimized.

18 Claims, 2 Drawing Figures

GROUND LEVEL
TOP OF SALT

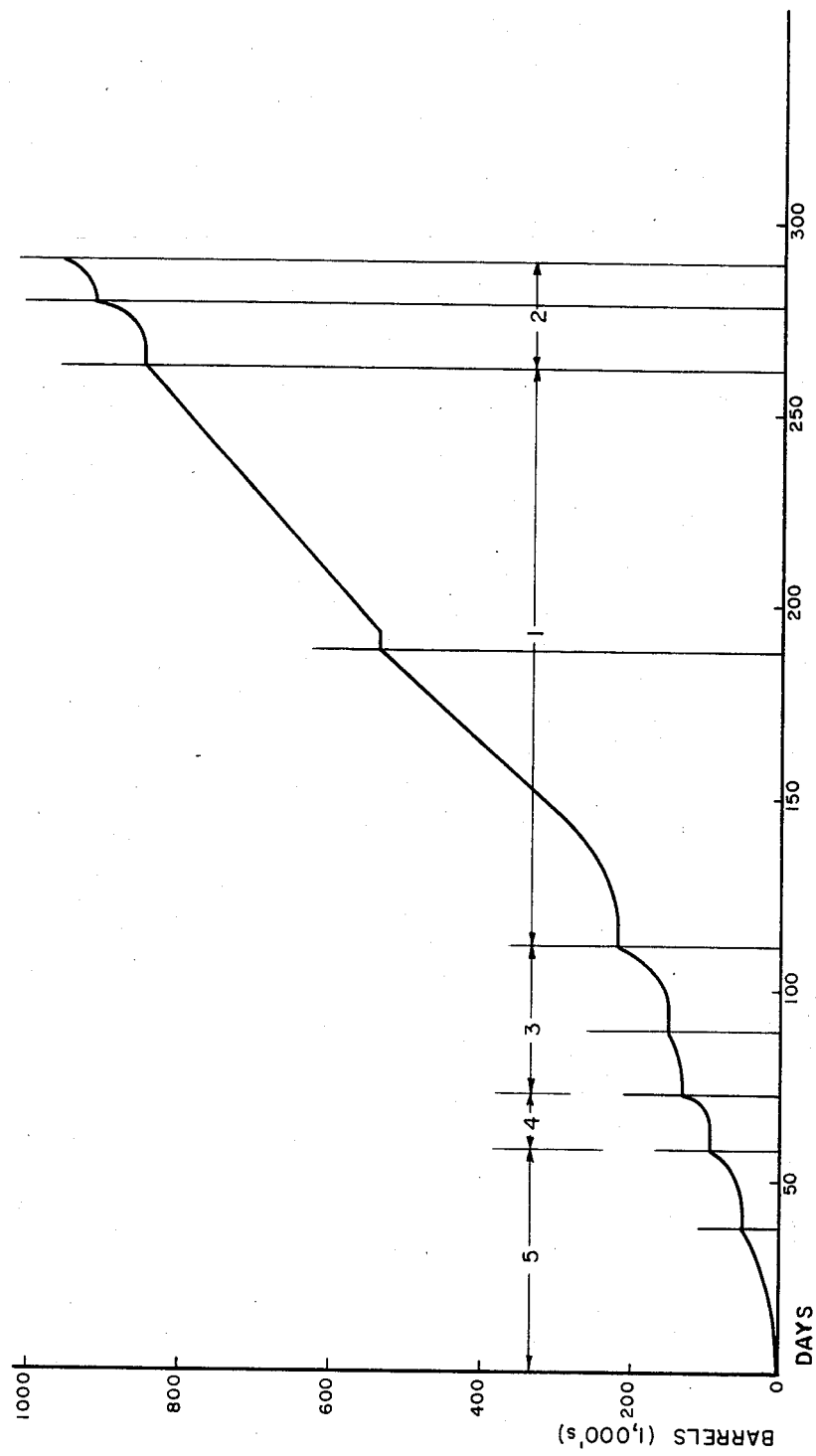

UNDERGROUND STORAGE CHAMBERS AND METHODS THEREFORE

BACKGROUND OF THE INVENTION

Caustic soda and chlorine are produced by the electrolysis of brine in a chlor-alkali plant. The electrolysis of brine produces 1.1 pounds of caustic for each pound of chlorine. The demand for caustic soda often is substantially less than that for chlorine. When this occurs there is a large requirement for caustic soda storage space, especially since the chlorine can be converted to ethylene dichloride which may in turn require large storage space when there is an unbalance in demand for chlorine and caustic. Another example of the requirement for large volume of storage space results in the cyclic marketing situation for anhydrous ammonia which is used as a direct application agricultural fertilizer at the time the soil is first prepared for planting. In this case the supply and demand for anhydrous ammonia are seldom in balance.

In any of the above cases and in other commerical production, especially in the oil and gas industries it is uneconomical to store large volumes of such products, for extended periods of time, which accumulate during the cyclic market conditions, in above ground tanks.

The liquefied petroleum gas (LPG) industry faced the problem of imbalance of supply and demand for LPG in the early 1950's with respect to propane and butane. The LPG industry resolved their problem by developing underground storage chambers in salt deposits via solution mining. This development allowed for balancing the supply and demand of propane and butane and this resulted in generating public confidence and a tremendous expansion of the LPG industry.

PRIOR ART

Typical solutions to the LPG storage problem are disclosed in U.S. Pat. No. 2,590,066 issued March 18, 1952 to R. L. Pattinson; U.S. Pat. No. 2,869,328 dated Jan. 20, 1959 to R. M. Gibson, et al; U.S. Pat. No. 3,084,515 dated Apr. 9, 1963 to P. F. Dougherty and U.S. Pat. No. 3,277,654 dated Oct. 11, 1966 to A. J. Shiver. Various other patents have disclosed storing materials other than petroleum products such as propane and butane including the storage of anhydrous ammonia as in U.S. Pat. No. 3,505,821 issued April 14, 1970 to S. E. Scisson, et al and the storage of aqueous radioactive waste liquids as disclosed in U.S. Pat. No. 3,491,540 issued on Jan. 27, 1970 and assigned to the United States Atomic Energy Commission. None of these disclosures permit the storage in underground solution mined salt chambers of fluid materials which are soluble or reactive with brine. U.S. Pat. No. 3,505,821 relates to the storage of anhydrous ammonia in underground rock formations, not salt chambers, and specifically to a method of removing connate water from the chamber by reacting it with the anhydrous ammonia and pumping the ammonia water out of the chamber. More recently, and as disclosed in U.S. Pat. No. 4,403,887 issued on Sept. 13, 1983 to Gloria, et al, a process is disclosed for covering the sump of an underground storage chamber formed in a salt dome for storage of liquid non-aqueous substances with a layer of highly viscous crude oil which is preferably 20 to 50 cm. thick. Also, this patent does not disclose a method for storing fluid materials which are readily soluable or reactive with water such as concentrated caustic soda, ethylene dichloride or anhydrous ammonia.

OBJECTS OF THIS INVENTION

Accordingly, it is an object of this invention to provide methods for the underground storage of fluid materials which are heavier than soluble in or reactive with brine within chambers which are solution mined in underground salt deposits.

It is a further object to provide methods for making the underground storage chambers and to provide methods for removing the brine produced during the solution mining of the chambers.

Still another object is to provide a method for permanently isolating and sealing off the insolubles such as anhydrite, sand, pebbles, etc., and the brine remaining in the sump (i.e. heel of residual brine) from the fluids to be stored which are readily soluble or reactive with water or brine.

Still further, another object of this invention is to provide a method for controlling the velocity of free fall of the fluids injected into the storage chamber to minimize erosion of the equipment employed.

Still other objects will be apparent and specifically disclosed in this specification and claims to follow.

These and other objects are realized by the methods and apparatus of this invention which will now be discussed.

BRIEF DESCRIPTION OF INVENTION

The foregoing and other objects are accomplished by the methods of this invention which compromise a method for storing fluids in an underground salt chamber made by producing a solution mined chamber in a salt deposit consisting of a sump chamber and a larger storage chamber above it, said chambers being connected by a substantially vertical funnel-like chamber having an opening to the sump chamber which is smaller in cross-section than the cross-section of the storage or sump chambers, whereby the anhydrite and insolubles resulting from the solution mining fall into the sump chamber;

withdrawing the brine from the upper storage and funnel like chambers, while maintaining a gas pressure in the evacuated space sufficient to minimize salt creep;

isolating said upper storage chamber from the lower sump chamber by plugging the neck of the funnel-like chamber connecting the upper and lower chambers with a sealant material which solidifies;

injecting the fluid to be stored into the storage chamber, whereby the propping gas is displaced; and recovering stored fluid, as desired.

Further the objects are also realized by the method for producing a multi-chamber cavity in an underground salt deposit for storage of fluids which comprises:

solution mining a cavity in said salt deposit consisting of a sump chamber, a larger storage chamber above it, and a connecting chamber which is a substantially vertical funnel-like chamber having an opening to the sump which is smaller in diameter than the diameters of the storage or sump chambers, whereby the insolubles and heel of brine collect in the sump chamber;

evacuating the brine produced from the storage chamber, funnel and portion of the neck of the connecting chamber, while maintaining a gas pressure in the space evacuated sufficient to prop-up the cavity;

sealing off the sump chamber from the storage chamber by inserting a sealant which solidifies on top of the heel of brine in the neck of said connecting chamber; and maintaining the cavity ready for storage of fluids by keeping it filled with propping gas maintained at a pressure to prevent cave-ins.

In addition the objects are accomplished by a multi-chamber cavity in an underground salt deposit for storage of fluids comprising:

a sump chamber, a larger storage chamber above it and a connecting chamber which is a substantially vertical funnel-like chamber having a narrow neck sufficient for permitting the insolubles resulting from the solution mining of said chambers to fall into the sump chamber along with a heel of brine;

means for withdrawing brine or storing fluids in said cavity;

means for injecting and withdrawing propping gas to and from said cavity;

said sump chamber and storage chamber being sealed off from each other by a solid plug in the neck of said funnel-like connecting chamber.

THE FIGURES

FIG. 2 is a graph showing the solution mining program for making a storage chamber in accordance with this invention showing the time required to solution mine a chamber having a 750,000 barrel fluid storage capacity.

Figure 1:
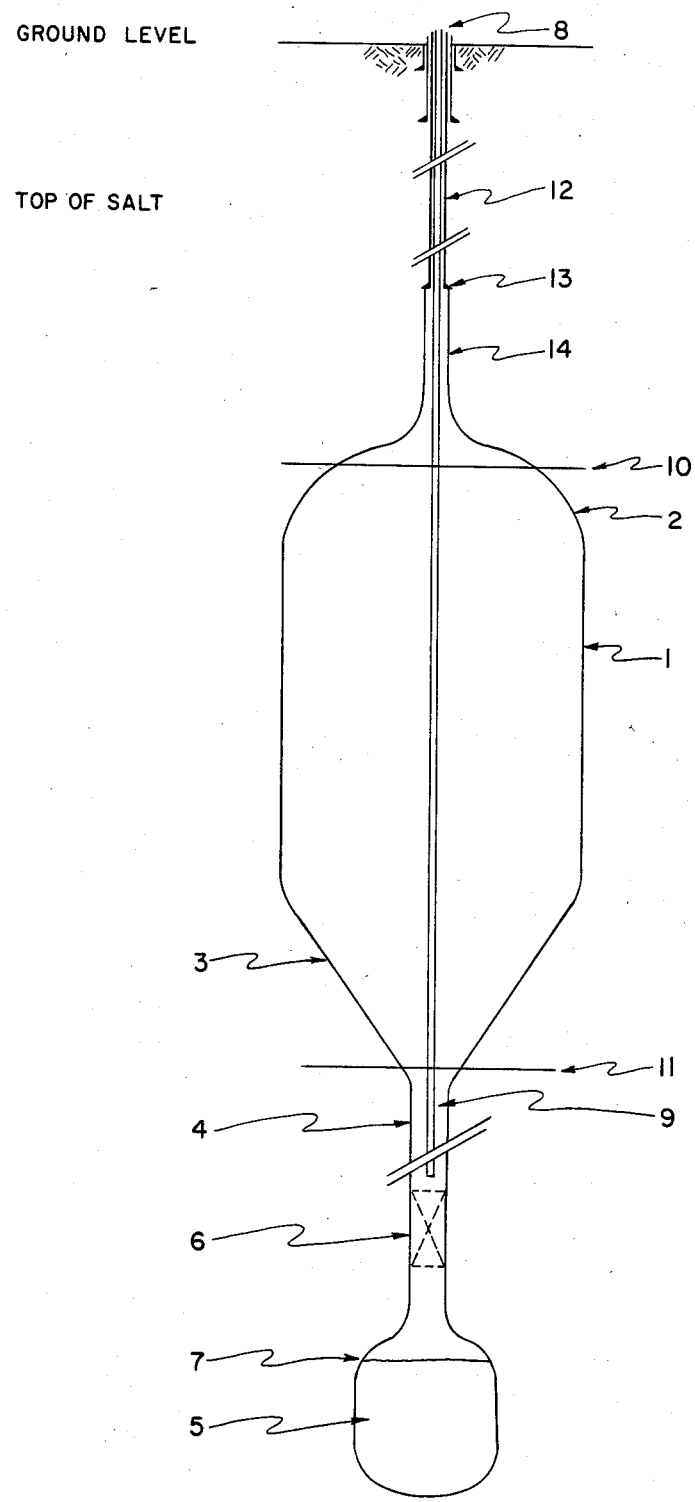
FIG. 1 is a diagramatic sketch of a vertical cross-sectional view of the underground storage facility according to this invention.

Referring to FIG. 1, which shows in cross-section the storage chamber 1, having a roof 2, funnel-like chamber 3, and neck 4. This storage chamber is isolated from sump 5, by plug 6, in neck 4. The insolubles or sand (anhydrite) level 7, is in the sump 5, or may be in the lower part of the neck 4, or at the bottom of plug 6. The wellhead 8, is the anchor point for the suspended casing 9, a submersible pump column (not shown is suspended in casing 9) as well as the connecting point for the valves which control the flow of stored fluid, and gases to and from the storage chamber. The fill point or level 10 for stored fluid is indicated as being below the top of the roof 2, when the storage chamber 1, is full of stored fluid. The gas which filled the chamber 1, at the end of the brine removal cycle has been displaced from the chamber 1 and is in the annulus space above level 10. In the withdrawal cycle of stored fluid from the storage chamber 1, pressurized gas is injected into an appropriate annulus and the level of fluid is lowered by the combined effect of the gas and a submersible pump to empty point or level 11.

Referring to FIG. 2 which shows a solution mining program used in developing a 750,000 barrel fluid storage chamber having the shape in accordance with the requirements of this invention as shown in FIG. 1. The horizontal axis represents elapsed days from the start of fresh water injections used to dissolve the solid in situ salt and return it to the surface as a brine of variable saturation. The vertical axis represents the cummulative barrels of solid salt removed (i.e., the barrels of storage space created) from start to finish of the solution mining operations. Lines vertical to the horizontal axis show the beginning and end of a specific solution mining cycle. An individual cycle may represent either a change in the location of the subsurface discharge point of the fresh water by adjustment in length of the suspended casing and tubing or a shift between flow areas the fresh water travels through (i.e., down the tubing or down the annulus between the tubing and suspended casing) to reach the salt face; a change in the fresh water flow rate; a change in the buffering fluid (or gas) level; or a combination of any of these. The time interval within which each particular portion of the chamber is developed is shown by the horizontal dimension lines and the number (corresponding to that in FIG. 1, where applicable) representing the chamber sections. The curve segments represent changes in the rate at which storage space is developed versus time. These changes occur because of the increased salt face exposed to solutioning as salt is removed from the space; a change in the rate fresh water is injected; a change in the direction of flow of the fresh water; or a combination of any or all of these factors. The short horizontal section in the curve indicate the solution mining operation has been temporarily suspended so a sonar caliper can be made to determine the actual shape of the particular segment of the cavern versus that projected (see the following comments on solution mining computer program). Adjustments are made, if necessary, in the solution mining variables in order to develop the desired shape. The straight sloping line indicates the area of salt face exposed is sufficient to utilize the full design rate of fresh water injection and return brine to the surface that contains a relatively constant high volume of salt in solution (i.e., say 90% salt saturated).

The magnitude of the variables previously discussed, the time interval during which these magnitudes are to be used, the time at which a variable(s) should be changed and the amount of change are predicted by use of a special solution mining computer program. Given the desired shape, dimensions and volumes of the various segments and the allowable range in the variables the computer print out will specify the actions to be taken and the time lapse required.

For example: To develop the sump shown in FIG. 1 the specific solution mining program might prescribe the following items—set suspended casing end at elevation X; set tubing string end at elevation Y; set buffering fluid level at elevation Z; 500 gpm fresh water injection down tubing for 39 days; expected brine saturations 40%; volume of salt removed 45,000 barrels; stop.

A sonar caliper would then be run for the reasons previously discussed.

If there is a significant difference in the actual shape versus that projected, because of some variations in the salt body composition, or for any other reasons, some judgment and experience is required to establish compensating adjustment in a variable(s).

These adjustments are incorporated in the program which then prescribes—1000 gpm fresh water injection down the annulus for 456 hours (19 days); expected brine saturation 40%; volume of salt removed 45,000 barrels; stop.

A confirmation sonar caliper is then run.

The funnel neck is then solution mined utilizing similar regumes as are the other segments (see FIG. 1, items 3, 1, 2) in appropriate sequence.

DESCRIPTION OF THE INVENTION

The first step in the process of developing the storage chamber 1 is to drill and install casing in an entry borehole 12 into the salt. This borehole 12 is then drilled, but not cased, to the total depth desired for the bottom of the sump 5. Next sump 5 is solution mined below the bottom of the storage chamber 1 to hold the insolubles, i.e., anhydrite, sand, pebbles, etc. which are released as salt is dissolved during development of the neck 4, the funnel 3 and the main section of the storage chamber 1. The neck 4, must be of vertical dimension sufficient to permit the plug 6 to be formed. The diameter of the neck 4 must also be such that an isolation plug 6 can be economically emplaced in it, and its height must be such that the volume of brine in the neck is sufficient to prevent the gas breaking around the end of the suspended casing 9 or so that the heel of stored fluid remaining in the neck 4 at the end of the product recovery cycle is economically tolerable. The funnel 3 of chamber 1 must have sufficient slope so the insolubles, released when salt is dissolved during chamber development, will fall or slide into the sump 5. In the solution mining, of chamber 1 the roof 2 of the chamber 1 will be formed so as to be self-supporting. The chamber 1 (including the funnel 3) will have a capacity (volume) sufficient for the intended storage purpose. The suspended casing 9 used for solution mining the system are removed when the solution mining is completed and the chambers are completely formed.

After the storage chamber 1 has been solution mined to the appropriate shape and volume, all the brine must be removed from the chamber 1 and substantially all from the neck 4. For purposes of removing the brine, a casing string, having an annulus, for withdrawing brine is lowered into the neck 4, set just above the proposed location of the isolation plug 6 and suspended from the wellhead 8. A submersible pump is then run inside the brine filled suspended casing to an appropriate depth. The brine is removed from the system by injecting a pressurized gas such as nitrogen which is inert with the product to be stored down the annulus and into the chamber 1. This gas forces the brine downward, around the end of and up the suspended casing 9 to a level above the submersible pump which is above the casing seat 13. The pump is then used to remove the brine to the surface. The residual brine or heel of brine in the neck 4 and the insolubles in the sump 5 must be isolated from the storage space and this is done in accordance with our invention by emplacing the plug 6 in the neck 4. The isolation plug 6 is emplaced after the brine has been removed from the chamber 1 to a desired level in the neck 4. The system is now in a configuration ready to receive fluid material to be stored.

Further description on installing the plug, its variations and materials which may be used will be discussed later, as well as the injection and withdrawal of fluid to be stored.

Among the fluids which may be stored in accordance with the invention are those heavier than brine such as caustic soda in its conventional marketing form (50% mix with water) or at other water concentration, and ethylene dichloride (EDC). Fluids lighter than brine which must remain free of water such as anhydrous ammonia may also be stored. The invention also allows for storage of other fluids, in which salt is not soluble, which are produced in large volumes and have a cyclic market.

The salt deposits the invention applies to include any deposits which are soluble in water and capable of being solution mined. Such deposits exist in numerous areas of the United States, Canada, Mexico, Central and South America, in various European nations both West and East, in Russia, China, Australia and countries of the Near East. These deposits occur as bedded salt, redeposited salt, salt diapirs, and intrusive salt plugs. The predominate salt in most of the deposits is sodium chloride however solution chambers in other soluble salts such as potash or trona may be used provided the fluids to be stored are not reactive with them.

The funnel-like lower portion of the storage chamber, covered by this invention, serves a number of purposes. The sloping side walls divert the insolubles, which include anhydrite, sand, pebbles, nodules, slab fragments and similar substances, released during salt dissolution, into the funnel neck and thence into the sump. The funnel neck is developed to a minimum diameter consistent with the original borehole deviation from vertical, and provides a space for and a gas tight seal around the suspended casing(s) through which the fluids being stored are injected or recovered. Because of the small diameter preferably (3-5 feet) of the neck or in other cases 5 to 10 feet or more, the volume of stored fluids required for the gas seal are minimal in relation to that of the main storage chamber. This volume of stored fluid, which normally remains in the chamber at the end of each withdrawal cycle, is referred to as the heel. Since the value of the heel is an idle investment to the stored product owner it should be as small as practical. This invention also encompasses a method for isolating the brine and insolubles in the sump from the storage chamber so stored fluids will not be lost into that area or contaminated with brine.

In accordance with this invention, an impermeable, pressure tight, solidified plug is placed in the funnel neck below the end of the gas seal area and above the sump. The plug may vary in vertical lengths from 20 to as much as 100 feet depending on the diameter of the funnel neck, the fluid to be stored and the amount of insolubles that might have accumulated in the neck. The plug material employed must be a sealant which solidifies and is resistant to the stored fluid, for example, neat salt saturated cement or the latter combined with varying amounts of lighter components, such as glass beads, fly ash, etc. Although cement is preferred, other materials may be employed which solidify, such as synthetic resins which are resistant to the stored material. Several different plug weights may be used. For example, if insolubles have filled the sump and have either accumulated in the neck to an acceptable level or some amount has been added from the surface, a neat cement plug may be emplaced from the top of the insolubles upward to the required length. If the sump has not been filled with insolubles and the brine in the funnel neck can be removed to the required degree, a floating plug section may be emplaced on top of the brine. After this first section of plug has solidified, the remaining portion of the plug may be emplaced in one or more additional sections on top of the first using salt saturated neat cement. If it is impractical or undesirable to remove the brine from the funnel neck before forming the plug, a neutral bouyancy plug may be emplaced. The neat cement may be formulated with a lightening agent such as glass beads so that the plug will neither float or sink in the brine filled portion of the neck it occupies. Additional increments of light or neat cement are emplaced above and in contact with the neutral, bouyancy section. In summary the isolation plug of this invention may be set on a base of insolubles, on top of brine or within a brine column depending on whether all, a portion of, or none of the brine is removed from the chamber prior to emplacing the plug.

The brine is removed from the chamber, funnel and funnel neck via a submersible pump lowered into a casing suspended from the wellhead. A gas, such as nitrogen which is compatible with the fluid to be stored, is injected down the cased borehole 12 and the suspended casing 9 annulus at a pressure and in volume sufficient to maintain a brine column in the suspended casing/pump column annulus (not shown) above the submersible pump suction during the time the latter is forcing the brine to the ground surface. The pressurized gas also acts as a propping agent to minimize inward movement (creep) of the salt when the brine head on it is removed.

In accordance with this invention the interior face of the cased borehole is never in contact with materials other than the propping gas. Since this casing passes through useable water aquifiers in the event it were penetrated, due to any internal or external action, only the inert (non-polluting) propping gas could escape into the aquifer. The suspended casing and pump column are the only elements exposed to the fluids being stored. These items are removeable and can be inspected and replaced if necessary.

The brine removal operation is considered to be completed and the chamber is ready for storage at the time the brine in the funnel neck has been lowered to a level such that the vertical length of the seal is just sufficient to prevent the pressurized gas from breaking around the end of the suspended casing.

The cased borehole 12 and the suspended casing 9 annulus, the uncased borehole 14, the chamber 1, funnel 3 and funnel neck 4 (down to the seal elevation) are now filled with pressurized gas. A short portion of the funnel neck, the suspended casing-pump column annulus and pump column are essentially full of brine. The injection of fluids to be stored, such as 50% caustic soda, could be started provided the volume of brine in the system could be tolerated when mixed with it. Alternatively, a small volume of 50% caustic may be injected into the neck area occupied by the brine and then withdrawn to lower the total brine content remaining in the system. Several such cycles might be required before the percentage of brine in the 50% caustic is tolerable. Another alternative is to replace the pump column and pump with a working tubing string, fitted with a sufficient number of gas lift valves which are inserted at appropriate intervals. The pressurized gas is then injected down the suspended casing 9 and the working tubing string not shown. It enters the first gas lift valve and aerates the brine column inside the tubing to a degree that the propping gas can force a portion of the brine to the surface. Successive gas lift valves progressively aerate the column until most of the residual brine has been removed from the system. The tubing string is stripped out of the suspended casing using conventional oil field equipment and procedures. The minor volume of brine remaining above the isolation plug 6 is removed with a hydrostatic bailer. The seal around the end of the suspended casing is then reestablished by dumping the fluid to be stored at a slow rate down the inside of the casing.

The stored fluid injection cycle may be started, at the design rate, once the chamber is ready for storage as discussed above.

Assuming the fluid to be stored is 50% caustic soda and the propping gas pressure, is 800 psig, this pressure would support a column of 50% caustic approximately 1665 feet above the lower end of the suspended casing.

If the end of the casing was 2665 feet below ground level, there would be a gas filled space in the suspended casing/pump column annulus having a vertical length of 1000 feet. Any liquid introduced into such a space would increase in velocity at a rate of 32.2 feet/second of fall. Since the erosion velocity limit for the steel in the suspended casing and pump column, contacted by the falling fluid, is approximately 15 feet/second it is essential that some means of reducing the velocity of free fall must be included. For example, a velocity control device consisting of a centralizer having orifice openings sized to produce a pressure drop of sufficient magnitude to support a column of stored fluids above the centralizer such that the free fall interval is about 10 feet from the bottom of the next higher centralizer. In the example mentioned it may be necessary to have such centralizers spaced 30 feet apart along the 1000 feet free fall interval. The propping gas pressure will rise as it is forced into an ever decreasing space by the incoming stored fluid. The casing seat of the final cemented casing string is the weakest point in the storage system. There will be a maximum allowable operating pressure for each storage chamber design. Automatic pressure relieving devices will be installed on each annulus to prevent any pressure from exceeding the above prescribed limits.

Stored fluids are removed from the chamber in the same manner and with the same type equipment utilized to remove the brine from the storage system taking into account the differences in temperature, specific gravity, viscosity, design flow rates and submersible pump setting occasioned by the change in fluids from sodium chloride brine to 50% caustic soda.

Although, we have described our invention using specific embodiments thereof to facilitate its understanding it should be understood that many modifications and variations of the invention described may be made without departing from the spirit and scope thereof.

We claim:

1. A method for storing fluids in an underground salt chamber which comprises:
    producing a solution mined chamber in a salt deposit containing anhydrite and insolubles, employing equipment including cemented casing liner of a cased borehole, suspended casing and tubing forming an annulus between them and consisting of a sump chamber and a larger storage chamber above it, said chambers being connected by a substantially vertical funnel-like chamber and a neck having an opening to the sump chamber which is smaller in cross-section than the cross-section of the storage or sump chambers, whereby substantially all of the anhydrite and insolubles resulting from the solution mining fall into the sump chamber;
    withdrawing the brine from the upper storage and funnel-like chambers while maintaining a gas pressure by introducing a propping gas in the evacuated space sufficient to minimize salt creep;
    isolating said upper storage chamber from the lower sump chamber by plugging the neck of the funnel-like chamber connecting the upper and lower chambers with a sealant material which solidifies;
    injecting the fluid to be stored and controlling its falling velocity into said annulus whereby the propping gas is displaced; and
    recovering stored fluid, as desired.

2. A method according to claim 1 wherein the fluid to be stored is heavier than, soluble in or reactive with brine.

3. A method according to claim 1 wherein the fluid to be stored is concentrated caustic soda.

4. A method according to claim 1 wherein the fluid to be stored is anhydrous ammonia.

5. A method according to claim 1 wherein the fluid to be stored is ethylene dichloride.

6. A method according to claim 1 wherein the brine produced is evacuated from the cavity by maintaining a propping gas pressure sufficient to force the brine to the surface.

7. A method according to claim 6 wherein the brine evacuation is assisted by deep well pumping.

8. A method according to claim 1 wherein the sealant material which solidifies is cement.

9. A method according to claim 1 wherein the sealant material is a synthetic resin resistant to the stored fluid.

10. A method according to claim 1 wherein the propping gas is nitrogen.

11. A method according to claim 1 wherein the propping gas is air.

12. A method according to claim 1 wherein the propping gas is recirculated and dried.

13. A method according to claim 1 wherein the pressure of the propping gas is regulated to minimize erosion of the equipment caused by the injection of fluid into the annulus between the suspended casing and tubing.

14. A method according to claim 1 wherein the free fall velocity in the annulus of the fluid to be sorted is controlled by velocity control devices so that its velocity does not exceed the fluid flow velocity at which the equipment erodes.

15. A method according to claim 1 wherein the amount of stored fluid recovered is more than ninety-eight percent of the total volume of fluid stored.

16. A method according to claim 1 wherein the stored fluid does not come in contact with the interior of the cemented casing liner of the cased borehole.

17. A method for producing a multi-chamber cavity in an underground salt deposit containing anhydrite and insolubles for storage of fluids which comprises:

solution mining a cavity in said salt deposit and removing substantially all the brine so formed leaving a heel of residual brine, consisting of a sump chamber, a larger storage chamber above it, and a connecting chamber which is a substantially vertical funnel-like chamber and a neck having an opening to the sump which is smaller in diameter than the diameters of the storage or sump chambers, whereby the insolubles and heel of residual brine collect in the sump chamber;

evacuating the brine produced from the storage chamber, funnel and portion of the neck of the connecting chamber, while maintaining a gas pressure in the space evacuated sufficient to prop-up the cavity;

sealing off the sump chamber from the storage chamber by inserting a sealant which solidifies on top of the heel of brine in the neck of said connecting chamber; and maintaining the cavity ready for storage of fluids by keeping it filled with propping gas maintained at a pressure to prevent cave-ins.

18. A multi-chamber cavity in an underground salt deposit containing anhydrite and insolubles for storage of fluids comprising:

a sump chamber, a solid plug separating a larger storage chamber above it and a connecting chamber which is a substantially vertical funnel-like chamber, said connecting chamber having a neck volume of less than 2% of the storage chamber capacity thereby minimizing the amount of unrecoverable stored fluid and the amount of solid required for the plug and in addition permitting substantially all the anhydrite and insolubles resulting from the solution mining of said chambers to fall into the sump chamber along with a heel of residual brine;

means for withdrawing brine or storing fluids in said cavity;

means for injecting and withdrawing propping gas to and from said cavity; and a solid plug in the lower part of the neck of said funnel-like connecting chamber thereby separating the heel of residual brine, anhydrite and insolubles in the sump from the stored fluid.

* * * * *